United States Patent Office 3,535,424
Patented Oct. 20, 1970

3,535,424
INSECTICIDAL 1 - (4 - HYDROXY - 3,5 - DI - TERT BUTYLPHENYL) - 2-MONO OR DISUBSTITUTED ETHYLENES
Keimei Fujimoto, Kyoto, Yositosi Okuno, Nishinomiya-shi, Taizo Ogawa, Minoo-shi, Akira Fujinami and Fukashi Horiuchi, Takarazuka-shi, and Yoshihiko Nishizawa, Nara-shi, Japan, assignors to Sumitomo Chemical Company, Ltd., Osaka, Japan, a corporation of Japan
No Drawing. Filed Oct. 2, 1967, Ser. No. 671,954
Claims priority, application Japan, Oct. 25, 1966, 41/70,620
Int. Cl. A01n 9/00, 9/06, 9/26
U.S. Cl. 424—304          9 Claims

ABSTRACT OF THE DISCLOSURE

A novel insecticidal composition harmless to humans and cattle comprising an effective amount of a derivative of 1-(4-hydroxy-3,5-di-tert-butylphenyl)-2-mono or disubstituted ethylene, which substituent may be cyano, carboxyl, a lower alkoxycarbonyl, a lower alkanoyl or nitro group. This composition is suitable and useful for preventing agricultural and sanitary injurious insects.

---

This invention relates to a novel insecticidal composition. More particularly, the invention pertains to an insecticidal composition containing as an active ingredient a phenol derivative of the formula,

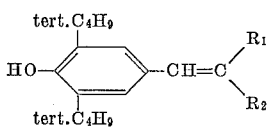

wherein $R_1$ is a hydrogen atom, a cyano group or a group represented by —$COOR_3$ or —$COR_4$; and $R_2$ is a cyano group, a nitro group or a group represented by —$COOR_3$ or —$COR_4$, where $R_3$ is a hydrogen atom or a lower alkyl group; and $R_4$ is a lower alkyl group.

It is an object of the present invention to provide as new insecticide having action to kill agricultural and sanitary injurious insects which are harmless to human and cattle and are usable without any fear. It would therefore be naturally thought of for those skilled in the art that by the combinations of chemicals, synergistic effects due to mixing may be expected.

The insecticidal activity of the present compounds is such that compositions containing the present compounds as active ingredients are not only markedly effective on leaf mites, which attack fruit trees, forests and vegetables; scales, billbugs which damage stored cereals; and beetles and such sanitary injurious insects as mosquitoes and flies, but also show insecticidal activity on insects belonging to Lapidoptera, Hemiptera and Coleoptera and on nematodes. This shows the fact that the present compounds can advantageously prevent and exterminate agricultural and sanitary injurious insects.

Useful compounds for the object of the present invention are as shown below, but the compounds of the present invention are, of course, not limited only to these.

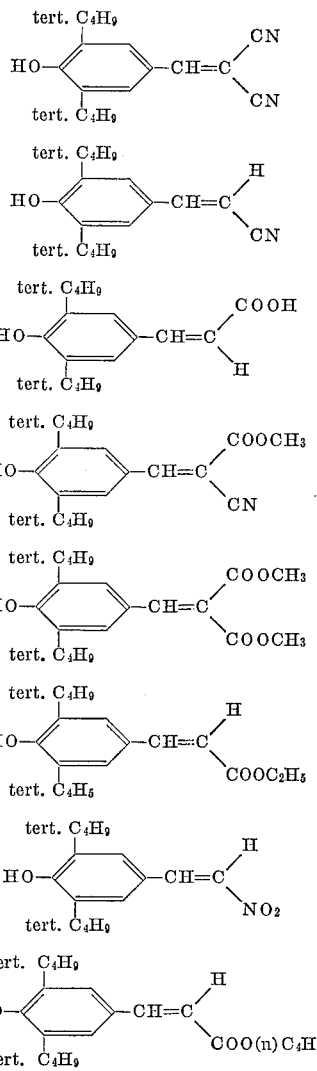

The compounds of the present invention can be easily prepared by treating 3,5-di-tert butyl-4-hydroxybenzaldehyde with compounds represented by the general formula

wherein $R_1$ and $R_2$ are as defined before, followed by dehydration and condensation.

Insecticidal compositions containing the present compounds as active ingredients may be formulated into any forms of emulsifiable concentrates, wettable powders, oil sprays, dusts and the like, according to procedures thoroughly known to those skilled in the art, without necessitating any particular conditions, and may be put into use adopting any desired forms and carriers. In formulating the present compounds into the above forms, agricultural excipients and extenders may be incorporated to enhance and ensure the effects of the present compounds. Further, the present compounds can be readily mixed with other active ingredients such as, for example, organophosphorus insecticides (Sumithion, Malathon, EPN, Dimethoate, etc.), chlorine-type insecticides (BHC, DDT, Endorin, etc.), pyrethroide-type insecticides (pyrethrin, allethrin, Neopinamin, etc.), miticides, nematocides, fungicides herbicides, fertilizers and the like, whereby multi-purpose compositions can be prepared without causing any detrimental effects due to mixing and without reducing the effects of individual constituent chemicals. Moreover due to the mixing, the effects of the present compounds can be ensured and enhanced.

The preparation of the present compositions as insecticides will be illustrated below with reference to examples. It is, however, needless to say that the additives and mixtures in the examples are variable to a wide scope. The figures in the parentheses show the numbers representing the compounds exemplified previously.

EXAMPLE 1

50 parts of the compound (1), 5 parts of Tokuseal Gu–N, 40 parts of Radiolite L40, and 5 parts of Sorpol 5029 are thoroughly mixed together to obtain a wettable powder having a main ingredient content of 50%. In application, the wettable powder is diluted with water and is then sprayed.

EXAMPLE 2

65 parts of the compound (2), 5 parts of a wetting vehicle (polyoxyethylene-alkylphenol ether type) and 30 parts of kaolin are thoroughly mixed together to obtain a 65% wettable powder. In application, the powder is diluted with water and is sprayed.

EXAMPLE 3

5 parts of the compound (3) and 95 parts of talc is thoroughly mixed and pulverized together to obtain a 5% dust. In application, the dust is dusted as such.

EXAMPLE 4

4 parts of the compound (4), 2 parts of sodium lignin sulfonate and 94 parts of 200 mesh clay are mixed together in this order. After kneading with a small amount of water, the mixture is granulated by means of a granulator and is dried to obtain a 4% granular preparation. In application, the granular preparation is sprinkled as such.

EXAMPLE 5

15 parts of the compound (5), 65 parts of methyl-isobutylketone and 20 parts of Sorpol 2020 are mixed together in this order to obtain a homogeneous emulsifiable concentrate. In application, the concentrate is diluted with water and is sprayed.

EXAMPLE 6

2 parts of the compound (7) and 3 parts of the compound (8) are dissolved in 50 parts of acetone. The solution is thoroughly mixed, while stirring, with a mixed powder comprising 35 parts of 200 mesh talc, 40 parts of clay and 20 parts of white carbon. Subsequently, acetone is removed by vaporization to obtain a 5% dust. In application, the dust is dusted as such.

Typical test examples concerning the effects of the present insecticides will be shown below.

Test Example 1

On mottled kidney bean plants cultivated to a 2-leaved stage in flower pots of about 3 inches in diameter, a large number of *Tetranychus uriticae* Koch were parasitized. To the plants, test chemicals at a given concentration were individually sprayed in a proportion of 7 ml. per pot. After 48 hours, the number of killed insects was counted to obtain the results as shown in the following table:

| Chemical | Concentration, diluted to— | Mortality, percent |
|---|---|---|
| Wettable powder of Example 1 | 200,000 times | 100 |
| Wettable powder of Example 2 | do | 79 |
| Emulsifiable concentrate of Example 5 | do | 80 |
| Dimethoate emulsifiable concentrate | do | 85 |

Test Example 2

Liquids of test chemicals at given concentrations (p.p.m.) were individually charged in 1 l. beakers. Into the beakers were put each 50 northern house mosquito larvae, which had been continuously reared in the laboratory of the inventors. After 24 hours, the mortality of the mosquito larvae was observed to obtain the results as shown in the following table:

| Chemical | Concentration, p.p.m. | Mortality, percent |
|---|---|---|
| Wettable powder of Example 1 | 0.02 | 82.3 |
| Granular preparation of Example 4 | 0.2 | 100.0 |
| Sumithion | 0.2 | 100.0 |

Test Example 3

In a field, egg apple plants were grown to a 5–6-leaved stage, and a large number of *Tetranychus telarius* Linné were parasitized on the back of the leaves. Thereafter, test chemicals at a given concentration was sprayed in a proportion of 150 l. per 10 ares, and the habitat density of the *Tetranychus telarius* Linné was measured with the lapse of days. The results were as shown in the following table:

| Chemical (diluted to 500 times) | Habitat density [1] | | | |
|---|---|---|---|---|
| | After 3 days | After 5 days | After 7 days | After 12 days |
| Wettable powder of Example 1 | 1,241 | 0 | 2 | 1 |
| Wettable powder of Example 2 | 965 | 50 | 21 | 35 |
| Wettable powder of Example 5 | 1,131 | 120 | 231 | 93 |
| Dimethoate | 1,320 | 35 | 99 | 42 |
| Non-treatment | 1,003 | 1,201 | 1,220 | 638 |

[1] Habitat density: The number of survival mites observed on the leaves of 10 plants individually having 5 leaves.

Test Example 4

In flower pots of about 5 inches in diameter, seasonless radishes parasitized with a large number of *Tetranychus uriticae* Koch were grown to a 6 to 7-leaved stage. To the leaves, test dusts at a given concentration were dusted in a proportion of 8 kg. per 10 ares by means of a bell jar duster. After 72 hours, the mortality of mites were observed to obtain the results as shown in the following table:

| Chemical | Mortality percent |
|---|---|
| Dust (5%) of Example 3 | 100 |
| Dust (5%) of Example 6 | 100 |

What is claimed is:

1. A method of killing insects comprising applying to the insects an insecticidally effective amount of at least one compound represented by the formula,

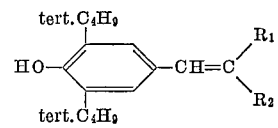

wherein $R_1$ is hydrogen, cyano or a group represented by —$COOR_3$ or —$COR_4$; and $R_2$ is cyano, nitro or a group represented by —$COOR_3$ or —$COR_4$, where $R_3$ is hydrogen or lower alkyl and $R_4$ is lower alkyl.

2. A method of killing insects comprising applying to the insects an insecticidally effective amount of a compound represented by the formula,

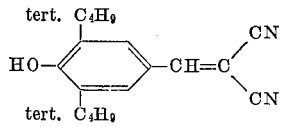

3. A method of killing insects comprising applying to the insects an insecticidally effective amount of a compound represented by the formula,

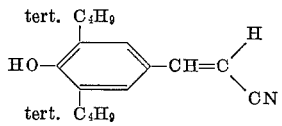

4. A method of killing insects comprising applying to the insects an insecticidally effective amount of a compound represented by the formula,

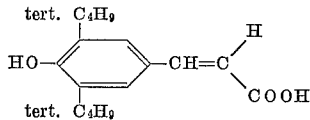

5. A method of killing insects comprising applying to the insects an insecticidally effective amount of a compound represented by the formula,

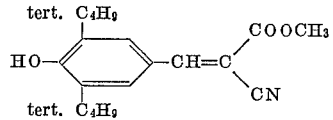

6. A method of killing insects comprising applying to the insects an insecticidally effective amount of a compound represented by the formula,

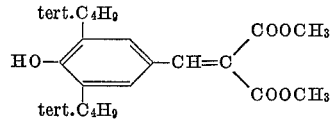

7. A method of killing insects comprising applying to the insects an insecticidally effective amount of a compound represented by the formula,

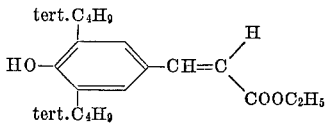

8. A method of killing insects comprising applying to the insects an insecticidally effective amount of a compound represented by the formula,

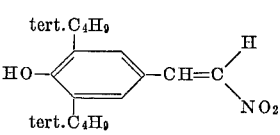

9. A method of killing insects comprising applying to the insects an insecticidally effective amount of a compound represented by the formula,

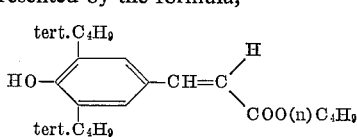

References Cited

UNITED STATES PATENTS 3,244,668  4/1966  Knapp et al.
3,280,069  10/1966  Knapp et al.

OTHER REFERENCES

Müller et al., Justus Liebigs Annalen der Chemie, vol. 645, pp. 53–65, (1961).

ALBERT T. MEYERS, Primary Examiner

V. D. TURNER, Assistant Examiner

U.S. Cl. X.R.

424—308, 317, 346